(12) United States Patent
Jones et al.

(10) Patent No.: US 11,480,025 B2
(45) Date of Patent: Oct. 25, 2022

(54) RAPID SETTING IN SITU CEMENT PLUGS

(71) Applicant: Halliburton Energy Services, Inc., Houston, TX (US)

(72) Inventors: Paul Joseph Jones, Houston, TX (US); Krishna P. Ravi, Kingwood, TX (US); Kyriacos Agapiou, Houston, TX (US)

(73) Assignee: Halliburton Energy Services, Inc., Houston, TX (US)

( * ) Notice: Subject to any disclaimer, the term of this patent is extended or adjusted under 35 U.S.C. 154(b) by 791 days.

(21) Appl. No.: 15/775,362

(22) PCT Filed: Mar. 8, 2016

(86) PCT No.: PCT/US2016/021383
§ 371 (c)(1),
(2) Date: May 10, 2018

(87) PCT Pub. No.: WO2017/155517
PCT Pub. Date: Sep. 14, 2017

(65) Prior Publication Data
US 2018/0334880 A1     Nov. 22, 2018

(51) Int. Cl.
*E21B 33/13* (2006.01)
*C09K 8/467* (2006.01)
(Continued)

(52) U.S. Cl.
CPC .............. *E21B 33/13* (2013.01); *C04B 28/04* (2013.01); *C04B 28/06* (2013.01); *C09K 8/467* (2013.01);
(Continued)

(58) Field of Classification Search
CPC ...................................................... E21B 33/13
See application file for complete search history.

(56) References Cited

U.S. PATENT DOCUMENTS 3,448,800 A * 6/1969 Wahl ................... E21B 33/138
166/294
3,727,691 A * 4/1973 Muecke ................. E21B 43/25
166/295
(Continued)

FOREIGN PATENT DOCUMENTS

CA        2956134 A1    1/2016
GB        2065256       6/1981
(Continued)

OTHER PUBLICATIONS

International Search Report and Written Opinion from PCT/US/2016/021383, dated Dec. 8, 2016, 24 pages.
(Continued)

*Primary Examiner* — William D Hutton, Jr.
*Assistant Examiner* — Avi T Skaist
(74) *Attorney, Agent, or Firm* — Thomas Rooney; C. Tumey Law Group PLLC

(57) ABSTRACT

Methods, compositions, and tools for use in creating rapidly forming plugs in situ in subterranean formations. In one instance, the disclosure provides a method that includes: placing a first pill comprising a calcium-aluminate-based cement composition at a plug location within the wellbore with the tubing; and placing a second pill comprising an alkaline fluid composition into the wellbore adjacent to the first pill with the tubing. In some cases there is a spacer fluid or spacer device between the first pill and the second pill. In some cases tubing having a mixing device is located at the bottom of the tubing in the wellbore to aid I mixing the first pill and the second pill to facilitate a chemical in situ reaction of the first pill and the second pill. The reaction between the first pill and the second pill forms a set plug at the plug location.

16 Claims, 6 Drawing Sheets

(51) Int. Cl.
*C04B 28/06* (2006.01)
*E21B 33/134* (2006.01)
*C04B 28/04* (2006.01)
*C04B 103/22* (2006.01)

(52) U.S. Cl.
CPC ........ *E21B 33/134* (2013.01); *C04B 2103/22* (2013.01); *Y02W 30/91* (2015.05)

(56) References Cited

U.S. PATENT DOCUMENTS

| | | |
|---|---|---|
| 3,844,351 A | 10/1974 | Sutton et al. |
| 4,674,573 A | 6/1987 | Bode |
| 5,368,103 A | 11/1994 | Heathman et al. |
| 5,900,053 A | 5/1999 | Brothers et al. |
| 6,143,069 A | 11/2000 | Brothers et al. |
| 6,332,921 B1 | 12/2001 | Brothers et al. |
| 8,307,899 B2 | 11/2012 | Brenneis et al. |
| 8,685,901 B2 | 4/2014 | Xu et al. |
| 2006/0131019 A1 | 6/2006 | Santra et al. |
| 2008/0182764 A1 | 7/2008 | Xu et al. |
| 2010/0006168 A1 | 1/2010 | Yano |
| 2011/0048711 A1 | 3/2011 | Lewis et al. |
| 2013/0299170 A1 | 11/2013 | Joseph et al. |
| 2015/0191644 A1 | 7/2015 | Patil et al. |

FOREIGN PATENT DOCUMENTS

| | | |
|---|---|---|
| WO | WO-2013/055843 A1 | 4/2013 |
| WO | 2016099444 A1 | 6/2014 |
| WO | 2015088536 A1 | 6/2015 |
| WO | 2015130284 A1 | 9/2015 |
| WO | 2016000772 A1 | 1/2016 |

OTHER PUBLICATIONS

Examination Report for application No. 2016396132 dated Feb. 23, 2021.

* cited by examiner

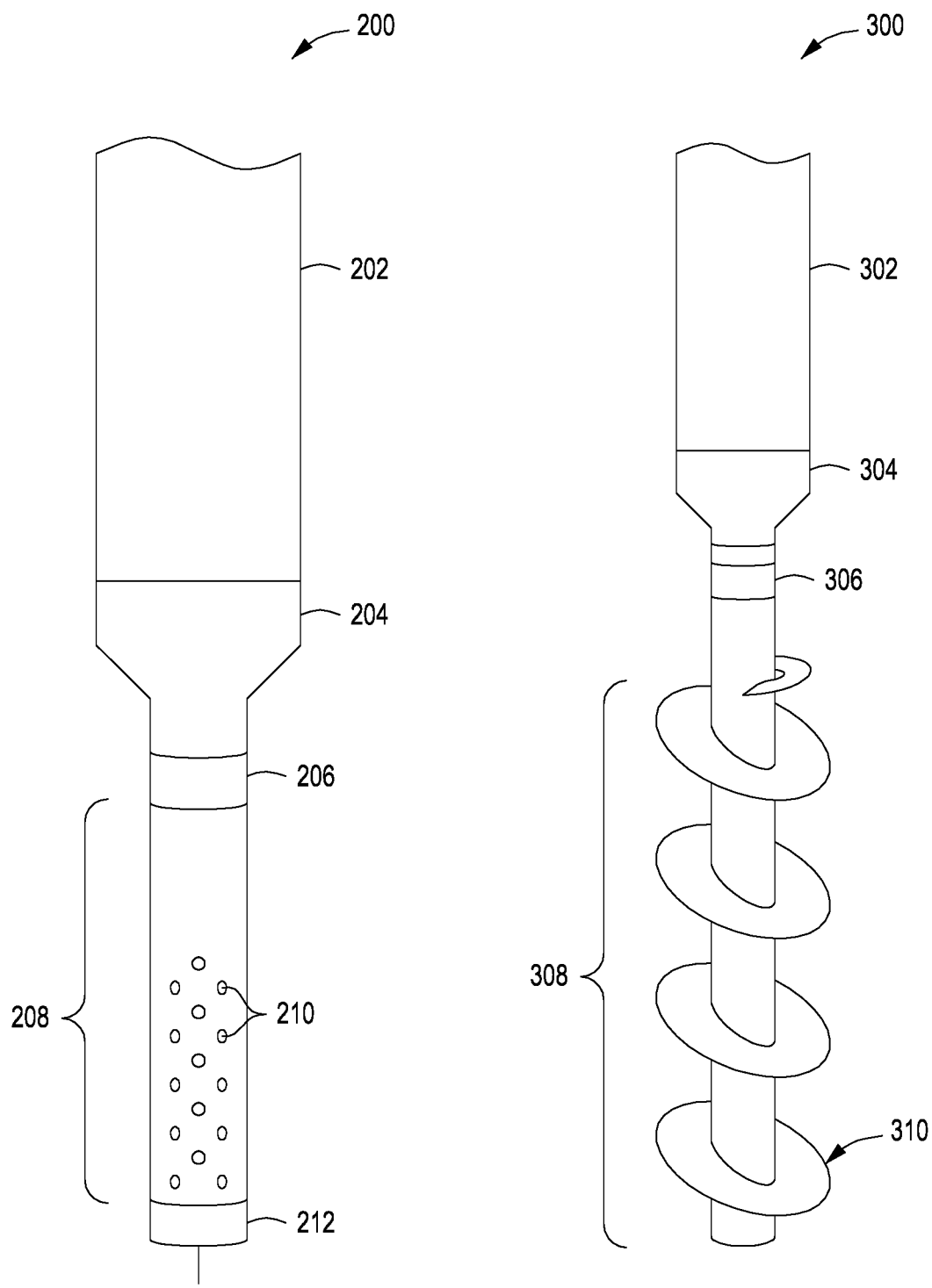

RAPID SETTING IN SITU CEMENT PLUGS

BACKGROUND

This application relates to methods, compositions, and tools for use in creating rapidly forming plugs in situ in oil and gas wells in subterranean formations.

Cement plugs are often used to form a barrier to prevent and/or reduce fluid communication between neighboring zones and within a subterranean formation. Some plugs are known as "kick-off" plugs; these provide a diversion in the wellbore to the drilling equipment to allow for a directional change in the orientation of the wellbore. As another example, well abandonment operations frequently involve placing cement plugs to ensure long-term zonal isolation between geological formations, replicating the previous natural barriers between zones. Such plugs should be resistant to degradation from the wellbore conditions (e.g., pressures, temperatures, and downhole fluids present in the wellbore or the surrounding formation).

Portland cement is often the material of choice for such cement plugs. Using Portland cement, however, may require extended time to achieve suitable compressive strength at wellbore conditions. As an example, at a well temperature of 200° F. (which is a relatively high temperature well), the set time for a Portland cement plug may be about 8 hours or more. If the well involves more mild wellbore conditions (e.g., cooler temperatures), the set time may be 48 hours or more.

BRIEF DESCRIPTION OF THE DRAWINGS

The following figures are included to illustrate certain aspects of the embodiments, and should not be viewed as exclusive embodiments. The subject matter disclosed is capable of considerable modifications, alterations, combinations, and equivalents in form and function, as will occur to those skilled in the art and having the benefit of this disclosure.

FIG. 2 illustrates a jet-mixing device that may be used as described herein.

FIG. 3 illustrates a spiral-mixing device that may be used as described herein.

DETAILED DESCRIPTION

Figure 1C:
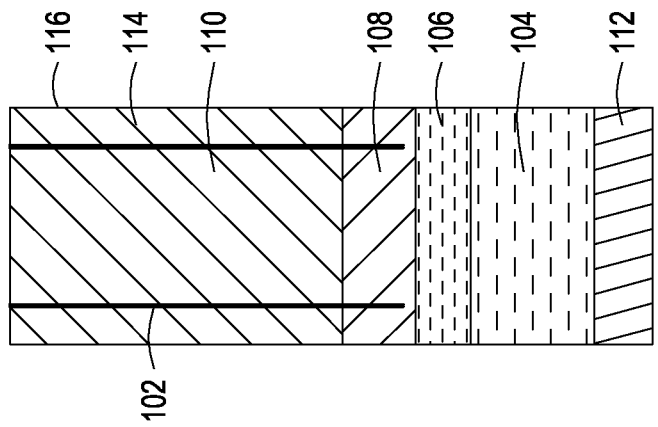
FIG. 1 (including FIGS. 1A, 1B & 1C) illustrates an example of the methods described herein.

This application relates to methods, compositions, and tools for use in creating rapidly forming plugs in situ in oil and gas wells in subterranean formations.

The methods, compositions, and tools described herein help reduce lost rig time usually associated with placing a cement plug in a wellbore. The methods, compositions, and tools described herein reduce the time for the cement plug composition to develop sufficient compressive strength under wellbore conditions. The savings in rig time may be about 50% or more, and in some instances, possibly about 75% or more, relative to a conventional cement wellbore plugging operation.

Densities, thickening times, and temperatures may have a strong influence on the strength development of the cement slurry that forms a cement plug. As an example, when a regular 15.9 lb/gal (pounds/gallon) Portland cement slurry is used to form a plug, the thickening time may be about 5 hours and 30 minutes with 10 to 15 hours of set time to reach 50 psi of compressive strength (established from the mixing time), as observed using an ultrasonic cement analyzer (UCA) (described below) at a temperature of 68° F. The ability to reduce this time to reach the same psi represents a significant increase in operational efficiency.

As described herein, this rig-time may be reduced by using two cement compositions to form a plug in situ (meaning within the wellbore itself, and preferably at the plug location) through a chemical reaction between these compositions. As described herein, in some instances, this chemical in situ reaction may be enhanced (e.g., through mechanical action, mixing aids, fluid choice vis-à-vis the other fluid, and combinations thereof, etc.) to further reduce the time needed for the plug to develop into a set plug having sufficient compressive strength. The resulting set plugs have desirable compressive strength, stability, and resistance to adverse wellbore conditions (e.g., high temperatures and corrosive environments). Moreover, these methods, compositions and tools discussed herein can be used advantageously in all kinds of subterranean wellbore applications, including, but not limited to, those that are offshore, high-temperature, high-pressure, or geothermal.

Examples of methods described herein may be adapted to meet the needs and conditions present in a particular job site, rig, or wellbore. In some instances, these methods may include the steps of (a) placing a first pill comprising a calcium-aluminate-based cement composition in a plug location within a wellbore, (b) placing a second pill of an alkaline fluid composition into the wellbore adjacent to the first pill so that a chemical in situ reaction occurs between the calcium-aluminate-based cement composition and the alkaline fluid composition forming a set cement plug in the plug location. In some instances, the first pill and the second pill may be separated in the wellbore by a separator, which may be a spacer fluid, a separation device (e.g., plugs, darts, wiper balls, and the like), or some combination thereof. Suitable separators are well known in the art. The second pill is placed axially adjacent to the first pill, meaning that it is uphole of the first pill along the wellbore axis. Where the first pill and the second pill are separated by a separation device as described herein, they are still be considered "axially adjacent" for the purposes of this disclosure. When a separator is employed, when the second pill is placed, it is likely directly axially adjacent to the separator downhole.

In some instances, a pill comprising the alkaline fluid composition may precede a pill comprising the calcium-aluminate-based cement. Preferably, however, the first pill comprises the calcium-aluminate-based cement composition and the second pill comprises the alkaline fluid composition.

As used herein, the term "pill" refers to a relatively small volume of one of the pumpable slurry compositions described herein that is placed in the wellbore. The terms "first" and "second" as used herein merely distinguish the two pills for clarity purposes and, therefore, should not be considered as limiting the number of pills that may be used or their deployment sequence.

Once the calcium-aluminate-based cement composition and the alkaline fluid composition contact one another, preferably in the desired plug location, the first pill and the second pill chemically react in situ to solidify and produce a set plug. While not wishing to be limited by any theory, it is believed that sequential placement of the first pill and the second pill allows one to control where the chemical in situ reaction takes place within the wellbore. Optimally, the chemical in situ reaction takes place in the plug location such that the resulting set plug lies in that location as designed. In some instances, the chemical in-situ reaction occurs through mere placement of the second pill at the plug location, which already contains the first pill, e.g., when the second pill is not preceded downhole with a spacer fluid. During placement of the second pill, one should be mindful of the quick nature of the reaction between the calcium-aluminate-based cement composition and the alkaline fluid composition, especially if not using a spacer fluid or some other separation device or system (e.g., a plug, dart, wiper ball, ball, etc.) between the two pills so as not to prematurely form a hardened mass in the wellbore above the desired plug location.

In some instances, the set time may be an hour at ambient temperatures and pressures. In some instances, this set time may be 2 hours or less at ambient temperatures and pressures. In some instances, this set time may be 5 hours or less at ambient temperatures and pressures. In some instances, this set time may be 10 hours or less at ambient temperatures and pressures. In some instances, this set time may be 15 hours or less at ambient temperatures and pressures.

As used herein, the term "plug location" refers to a location within a wellbore where a plug is to be deployed for a specific purpose. A plug location may be the bottom of a well, i.e., the lowest point, or it may be at any intermediate wellbore location between the bottom of the well and the well opening. The plug location may be in an open wellbore or a cased wellbore; the disclosure herein applies to both open and cased wellbores.

As used herein, the phrases "a chemical in situ reaction" and "in situ chemical reaction" as used herein refer to a rapid (e.g., within about an 1 hour of contacting the reactants or less) chemical reaction that occurs downhole, e.g., at the plug location, between the components of the first pill and the components of the second pill.

As used herein, the term "a set cement plug" refers to a solidified plug made by the chemical in situ reaction between the components of the first pill and the second pill, the solidified plug having a compressive strength of at least 50 psi within a given set time.

The compressive strength of a plug may be measured for a set plug as described herein at a specified time after the compositions have been mixed and at a specified temperature and pressure. Compressive strength can be measured at any time after mixing, for example, at a time of 24 hours post-mixing. In some instances, the compressive strength testing should be performed at the lowest wait-on-cement time. Methods of measuring compressive strength are discussed below. Laboratory tests can be performed under simulated downhole conditions; such tests should be representative of downhole compressive strength, but may vary from direct laboratory testing of model plugs.

As may be appreciated by those skilled in the art, the compressive strength of a plug usually cannot be measured when the plug is deployed and set in the wellbore; thus, determining whether something has compressive strength, as described herein, should not be determined using a downhole method. Laboratory measurements of representative compressive strength are believed to be more reliable for determining "compressive strength" as discussed herein.

In an example, to determine compressive strength in a laboratory test, a plug sample is cured and crushed. The pressure required to break (i.e., crush) the plug sample is referred to as its compressive strength. This type of destructive method may be referred to as a crush compressive strength method. Such tests can only be performed once on a sample because it is destructive.

In another example of a laboratory method for determining compressive strength, the compressive strength of a set cement plug as described herein may be determined using the non-destructive method according to ANSI/API Recommended Practice 10B-2 (2nd Edition, Apr. 1, 2013) as follows. This non-destructive method continually measures correlated compressive strength of a set cement plug sample throughout the test period by utilizing a non-destructive sonic device, such as an Ultrasonic Cement Analyzer (UCA) available from FANN® Instruments in Houston, Tex. The UCA continually measures the transit time of the acoustic signal through the sample. The UCA contains preset algorithms that correlate transit time to compressive strength. The UCA reports the compressive strength of the cement composition in units of pressure, such as psi or MPa.

Nonetheless, if one were to measure the effectiveness of a plug in a wellbore, one might look to its mechanical integrity, which can be verified through applicable tests such as pressure tests, inflow tests, and tagging in the well. Such downhole tests may be correlated to weight-on-cement time. The method used for verification of a plug's compressive strength may be different depending on the location of the wellbore of interest, e.g., onshore versus offshore.

As used herein, the term "set," and all grammatical variations thereof, is intended to refer to the process of a cement composition becoming hard or solid by curing.

As used herein, the term "set time" as used herein refers to the time period from when the first pill and the second pill are first mixed and the time a set cement plug is formed. In a job site setting, after the set time the integrity of the barrier formed by the set cement plug can be determined by suitable methods, such as tagging the cement plug, pressure testing, or inflow testing. When the set time is determined in a laboratory setting, "set time" can be measured by UCA instrumentation using API standard Recommended Practice 10B-2 or direct measurement through measuring the stress required to crush the cement. The laboratory set time and the actual set time in a wellbore should be roughly equivalent under equivalent conditions.

As used herein, the phrase "a balanced method of placement" refers to a method of placing at least the first pill into the wellbore while balancing the volume of fluid in the work string and the column of fluid in the annulus. This balanced method involves carefully determining the volumes of the first pill and any other accompanying displacement fluids, e.g., spacer fluids, so that a balance of pressures is maintained in the string and the annulus.

As used herein, the phrase "pump and pull placement" refers to a method of placing at least the first pill into the wellbore while pulling the work string from the wellbore at a rate equivalent to the fill rate of the pill in the casing or open hole.

The term "work string" as used herein is as a generic term that describes a tubing string used to convey a treatment fluid or other fluids, or used for well service activities. Both coiled and jointed tubing strings are contemplated within the meaning of the term "work string."

While compositions and methods are described herein in terms of "comprising" various components or steps, the compositions and methods can also "consist essentially of" or "consist of" the various components and steps.

Suitable calcium-aluminate-based cement compositions and alkaline fluid compositions for use as described herein are described in detail below. As a guiding principal in any particular application of the disclosure, the components of the calcium-aluminate-based cement composition and the components of the alkaline fluid composition should be chosen such that when the compositions are combined, an exothermic chemical in situ reaction occurs forming a set plug within a desired amount of time, preferably in the plug location.

Suitable "calcium-aluminate-based cement compositions" for use as described herein comprise a calcium-aluminate-based cement, which may include a calcium-aluminate cement (CAC), a calcium-aluminate magnesia cement (CAM), calcium sulfoaluminate cement (CSA), and/or a calcium-aluminate phosphate cement (CAP). Mixtures of these may also be suitable. In at least some embodiments, the calcium-aluminate-based cement composition should account for about 25 weight (wt.) % to 100 wt. % of a dry powder calcium-aluminate-based cement composition, the remainder of the composition including an aqueous fluid and other additives suitable for the desired operation that do not negatively affect the plugging operation, as described in more detail below. It is believed that these calcium-aluminate-based cements are useful in these compositions because they exhibit increased resistance to degradation by wellbore conditions, especially in high temperature wells and wells containing corrosive fluids. The set time, for such cements, however, is very rapid, especially at high temperatures. As such, the set time of the calcium-aluminate-based cement composition must be balanced with the additives in the composition and the alkaline fluid composition (described below). An example of commercially available calcium-aluminate-based cement is THERMALOCK™, marketed by Halliburton Energy Services, Inc. Another suitable example is SECAR® 71, available from Kerneos, Inc.

Figure 6:
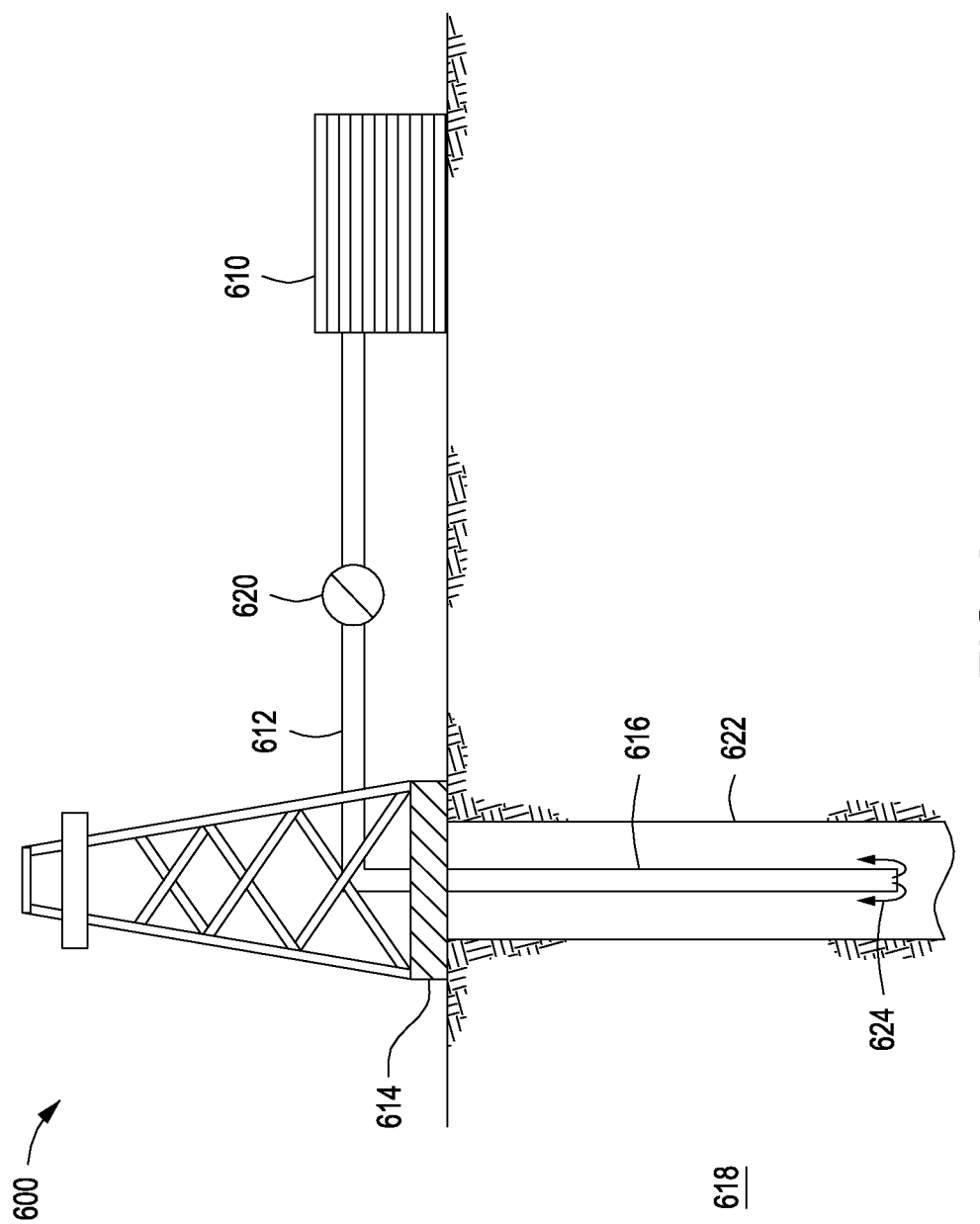
FIG. 6 shows an illustrative schematic of a system that can deliver a cement composition as described herein to a downhole location, according to one or more descriptions herein.

The components of the calcium-aluminate-based cement compositions described herein may be combined in any order desired by the user to form a "pumpable slurry" (i.e., a composition that has enough fluidity to be pumpable at a job site) that may then be placed into a wellbore. An example of a pumpable slurry is one that has a consistency of less than 70 Bearden units of consistency (Bc). The components of the calcium-aluminate-based cement compositions may be combined using any mixing device compatible with the composition, for example a jet mixer, a bulk mixer, or a recirculating mixer. In one example, the additives are included with the aqueous fluid before being mixed with the calcium-aluminate-based cement component of the calcium-aluminate-based cement composition. In an alternative example, the additives are available as solid particles and combined with the other solid particles of the calcium-aluminate-based cement composition before water is introduced to the composition. In another alternative example, the additives are included in the aqueous fluid as well as solid particles with the other solid particles of the calcium-aluminate-based cement composition. The calcium-aluminate-based cement composition should remain in a pumpable slurry state before and during introduction into the subterranean formation via the wellbore. FIG. 6 (discussed fully below) illustrates an example of how mixing may occur on a wellsite.

The calcium-aluminate-based cement compositions include an aqueous fluid, which can be selected from the group consisting of freshwater, brackish water, seawater, brine, and saltwater, in any combination thereof in any proportion. The aqueous fluid should be included in the calcium-aluminate-based cement composition in an amount sufficient to form a pumpable slurry. The aqueous fluid may be present in the amount from about 20% to about 180% by weight of cement (bwoc), alternatively and additionally, 25% to about 60% bwoc. Any range between these is suitable as well. The amount of aqueous fluid included may depend on the desired density of the cement slurry and the desired slurry rheology, and as such, may be determined by one skilled in the art having the benefit of this disclosure.

The calcium-aluminate-based cement composition can also include a salt, for example, sodium chloride, calcium chloride, calcium bromide, potassium chloride, potassium bromide, magnesium chloride, and any combination thereof in any proportion. Preferably, if included, the salt concentration in a composition is in the range of about 0.1% to about 40% by weight of the aqueous fluid. Any range between these disclosed is suitable as well.

As stated above, the calcium-aluminate-based cement composition may include additives suitable for the desired operation that do not negatively affect the plugging operation. Any of the additives discussed may be included singularly or in combination. Examples include those known to those skilled in the art that are commonly used in cement compositions. Examples of such additives include, but are not limited to, set retarders, defoamers, foaming surfactants, fluid loss agents, weight materials, surfactants, latex emulsions, dispersants, vitrified shale and other fillers such as fly ashes, silica flours, sand and slag, formation conditioning agents, hollow glass or ceramic beads or microspheres, cement kiln dust (CKD), and combinations and/or derivatives thereof. Examples of other additives include, but are not limited to, fillers, friction reducers, lightweight additives, high-density additives, expansion additives, lost-circulation materials, filtration-control additives, thixotropic additives, and combinations thereof. Other additives may include silica, barite, hematite, ilmenite, manganese tetraoxide, glass fibers, carbon fibers, nylon fibers, polyvinylalcohol fibers, polylactic acid fibers, polyvinylchloride fibers, polyethylene fibers or polyurethane fibers or combinations thereof. In some instances, any of these additives can be included at included in the first pill and/or the second pill in amounts ranging from about 0.1 wt. % to about 10 wt. %, alternatively and additionally, from about 0.3 wt. % to about 5 wt. %, and alternatively and additionally from about 2 wt. % to about 3 wt. % based on the pill volume. All ranges between these stated ranges are suitable.

Set retarders, such as organic acids (e.g., tartaric acid, citric acid, oxalic acid, gluconic acid, oleic acid, and uric acid, and combinations thereof), monovalent cationic compounds (e.g., a monovalent metal salt such as alkali metal salts of sodium, potassium and lithium), polyvalent cationic compounds (e.g., alkaline earth metal salts like magnesium chloride, calcium nitrate, calcium chloride; transition metal salts such as titanium (IV) sulfate, titanium (IV) tartrate, zirconium (IV) acetate, zirconium (IV) citrate, zirconium (IV) lactate, cobalt (II or III) chloride and nickel (II) chloride; or combinations thereof), and the like may be especially useful in the calcium-aluminate-based cement compositions to manage the set time of the composition. In some embodiments, a set retarder may be included in the calcium-aluminate-based cement compositions in amounts ranging from about 0.1 wt. % to about 10 wt. %, alternatively and additionally, from about 0.3 wt. % to about 5 wt. %, and alternatively and additionally from about 2 wt. % to about 3 wt. % based on the calcium-aluminate-based cement composition. Any range between these disclosed is suitable as well.

Mechanical property modifying additives, for example, carbon fibers, glass fibers, metal fibers, mineral fibers, and the like may be added to further modify the mechanical properties of the composition when pumped or set. Methods for introducing these additives and their effective amounts are known to those ordinarily skilled in the art. As an example, a mechanical property modifying additive may be mixed into the calcium-aluminate-based cement composition slurry in amounts ranging from about 0.1 wt. % to about 10 wt. %, alternatively and additionally, from about 0.3 wt. % to about 5 wt. %, and alternatively and additionally from about 2 wt. % to about 3 wt. % based on the calcium-aluminate cement content of the calcium-aluminate-based cement composition. Any range between these disclosed is suitable as well.

The calcium-aluminate-based cement composition may contain an expansion additive. These additives are intended to induce expansion of the set cement and may include systems that rely on the formation of ettringite. Other additives that can result in post-set expansion include magnesium oxide; salts of NaCl and KCl; and powders of aluminum, magnesium, iron, and zinc. Suitable examples of commercially available expansion additives include, but are not limited to, MicroBond™, MicroBond M™, Microbond HT™, Super CBL™, and Super CBL™ EXP, marketed by Halliburton Energy Services, Inc. In some examples, the expansion additive is in a concentration in the range of about 0.1% to about 10% bwoc. Any range between these disclosed is suitable as well.

In some embodiments, the calcium-aluminate-based cement compositions may be foamed using an inert gas such as nitrogen or using other techniques as known in the art. Foamed calcium-aluminate-based cement compositions, for example, are described in, e.g., U.S. Pat. Nos. 6,332,921, 5,900,053, and 6,143,069. In other examples, the calcium-aluminate-based cement composition can include a filler. Suitable examples of fillers include, but are not limited to, fly ash, sand, clays, and vitrified shale. In some examples, the filler is in a concentration in the range of about 5% to about 50% bwoc. Any range between these disclosed is suitable as well.

The calcium-aluminate-based cement composition can include a friction reducer. Suitable examples of commercially available friction reducers include, but are not limited to, CFR-2™, CFR-3™, CFR-5LE™, CFR-6™, and CFR-8™, marketed by Halliburton Energy Services, Inc. In some instances, the friction reducer is included a concentration in the range of about 0.1% to about 10% bwoc. Any range between these disclosed is suitable as well.

Commercially-available examples of other additives include, but are not limited to, and are marketed by Halliburton Energy Services, Inc. under the tradenames HIGH DENSE® No. 3, HIGH DENSE® No. 4, BARITE™, and MICROMAX™, heavy-weight additives; SILICALITE™, extender and compressive-strength enhancer; WELLLIFE® 665, WELLLIFE® 809, and WELLLIFE® 810 mechanical property enhancers.

In some instances, the calcium-aluminate-based cement composition may include a fluid loss additive. The fluid loss additive can be a liquid, a liquid concentrate, or a solid powder. Preferably, the fluid loss additive is compatible with the calcium-aluminate-based cement composition. For example, some fluid loss additives that work well for Portland cements, do not provide the desired fluid loss when used in a calcium-aluminate-based cement composition. Examples of suitable fluid loss additives include hydroxyethylcelluloses, styrene-co-butadiene polymers, and derivatives and/or combinations thereof. Commercially available examples of suitable fluid loss additives include, but are not limited to, LATEX 3000™, marketed by Halliburton Energy Services, Inc. According to an embodiment, a fluid loss additive is included in a calcium-aluminate-based cement composition described herein in a sufficient concentration such that the cement composition has a fluid loss of less than 50 mL/30 minutes, preferably less than 40 mL/30 minutes, more preferably less than 35 mL/30 minutes at a temperature of 145° F. (63° C.) and a pressure differential of 1,000 psi (7 MPa). Any range between these disclosed is suitable as well.

In some instances, the calcium-aluminate-based cement composition may include a suspending agent, e.g., a polymeric suspending agent.

According to an embodiment, the calcium-aluminate-based cement composition (at the surface of the wellbore prior to pumping it downhole) has a density of at least 7 pounds per gallon "ppg" (0.84 kilograms per liter "kg/L"). The calcium-aluminate-based cement composition can have a density (at the surface of the wellbore prior to pumping it downhole) in the range of about 7 to about 22 ppg (about 0.84 to about 2.6 kg/L). Any range between these disclosed is suitable as well.

Suitable "alkaline fluid compositions" for use as described herein include a solid component selected from the group including Portland cement, lime, alkali hydroxides (e.g., sodium hydroxide), alkali earth hydroxides, cement kiln dust, slag, Class C fly ash, and the like. Combinations of these may also be suitable as long as the pH of the composition is sufficiently alkaline to react with the calcium-aluminate-based cement composition in a desired way. In some instances, the pH of an alkaline fluid composition as described herein may be about 7 or higher. In some instances, the pH of an alkaline fluid composition as described herein may be about 8 or higher. In some instances, the pH of an alkaline fluid composition as described herein may be about 9 or higher. In some instances, the pH of an alkaline fluid composition as described herein may be about 10 or higher. In some instances, the pH of an alkaline fluid composition as described herein may be about 11 or higher. In some instances, the pH of an alkaline fluid composition as described herein may be about 12 or higher. Any range between these disclosed is suitable as well.

As an example, Portland cements of the various types identified as API Classes A through H and J are suitable for use as described above in the alkaline fluid compositions described herein. Such cements are identified and defined in API Specification for Materials and Testing for Well Cements, API Specification 10, Third Edition, Jul. 1, 1986, of the American Petroleum Institute. In some instances, the compositions of the present invention are comprised of API Class H Portland cement.

In some instances, the solid component comprises about 1 weight percent (wt %) to 90 wt % of an alkaline fluid composition. In some instances, the solid component comprises about 10 wt % to 80 wt % of an alkaline fluid composition. In some instances, the solid component comprises about 30 wt % to 70 wt % of an alkaline fluid composition. The balance of the compositions includes an aqueous fluid as well as any other additives suitable for the desired operation that do not negatively affect the plugging operation or the chemical in situ reaction.

The alkaline fluid compositions include an aqueous fluid, similar to the calcium-aluminate-based cement compositions above, which can be selected from the group consisting of freshwater, brackish water, seawater, brine, and saltwater, in any combination thereof in any proportion. The aqueous fluid should be included in the alkaline fluid composition in an amount sufficient to form a pumpable slurry. The aqueous fluid may be present in the amount from about 20% to about 80% bwoc, alternatively and additionally, 25% to about 60% bwoc. Any range between these disclosed is suitable as well. The amount of aqueous fluid included may depend on the desired density of the alkaline fluid composition slurry and the desired slurry rheology, and as such, may be determined by one skilled in the art having the benefit of this disclosure.

The alkaline fluid composition can also include a salt, for example, sodium chloride, calcium chloride, calcium bromide, potassium chloride, potassium bromide, magnesium chloride, and any combination thereof in any proportion. In some instances, if present, the salt is in a concentration in the range of about 0.1% to about 40% by weight of the water. Any range between these disclosed is suitable as well.

Any suitable additive that does not negatively interfere with the alkaline fluid composition, the calcium-aluminate-based cement composition, and/or the plugging operation or the resulting plug, may be included in the alkaline fluid composition. Additionally, any such additives should not negatively impact the reaction between the calcium-aluminate-based cement composition and the alkaline fluid composition in view of the goals of the plug formation and operation. However, while not wishing to be limited by any theory, it is believed that the chemical in situ reaction supersedes all interactions of the additives. Examples of such suitable additives have been discussed above with respect to the calcium-aluminate-based cement compositions. These same additives may be included in an alkaline fluid composition as described herein provided they do not negatively interfere. For the sake of brevity only, they will not be repeated here. The same exemplary ranges disclosed for the calcium-aluminate-based cement compositions are suitable in the alkaline fluid compositions as well.

The same methods of incorporating the aqueous fluids and the additives to form the alkaline fluid composition as described above with respect to the calcium-aluminate-based cement compositions may be used, and for the sake of brevity only, they will not be repeated here.

In one instance, the alkaline fluid composition (at the surface of the wellbore prior to pumping it downhole) has a density of at least 7 ppg (0.84 kg/L).

In some examples, the chemical in situ reaction may be enhanced through the physical mixing of the calcium-aluminate-based cement composition and the alkaline fluid composition, e.g., as the result of a density differential between the two compositions. If the density of the second pill is greater than the density of the first pill, the density differential can enhance the mixing of the two pills to improve homogeneity for the chemical in situ reaction. If a spacer fluid is used between the two pills, optionally, the density of the spacer fluid should be lower than the second pill as well to ensure the second pill passes through the spacer fluid. In some instances, the density differential can range from 0.1 lb/gal to 10 lb/gal, or in some instances, 0.5 lb/gal to 5 lb/gal. Any density, density differential, or density range between these disclosed is suitable as well.

As is well understood by those skilled in the art, the selection of one of the particular compounds or derivatives thereof described above with respect to the calcium-aluminate-based cement compositions and the alkaline fluid compositions depends at least on the depth of the wellbore to be plugged, the location of the plug in the well, the wellbore conditions, the time required for placing a cement composition in a desired location within the wellbore, other additives included in the cement composition, and various other factors well known to those skilled in the art.

Optionally, but preferably, separators can be used between the first pill and the second pill to keep them separated until the in situ reaction. Examples of separators include spacer fluids and separation devices. Suitable spacer fluids for use as described herein may include any suitable downhole fluid that may be used to physically separate the first pill and the second pill. Preferably, the spacer fluid is compatible with the first pill and the second pill given the wellbore conditions and chemical in situ reaction. Preferably, the spacer fluid does not negatively affect the chemical in situ reaction between the first pill and the second pill. An example of a suitable spacer fluid is water (e.g., fresh or brine). In some instances, the spacer fluid may include additives that may enhance the chemical in situ reaction between the first pill and the second pill. For example, accelerating additives may be included that promote the in situ reaction between the calcium-aluminate-based cement composition and the alkaline fluid composition. In some instances, it may be advisable to evaluate the specific spacer fluid to be used with the chosen components of the first pill and the second pill to verify that there are no negative interactions between them that would adversely affect the chemical in situ reaction or the properties of the resulting set plug.

In some instances, a separation device may be a mechanical device, such as a plug, a ball, a wiper, or a dart. Such devices are well known in the art. The device can be removed or moved up the wellbore to allow the in situ reaction to occur.

In some instances, the chemical in situ reaction of first pill and the second pill is mechanically enhanced, e.g., by aid of a mixing device. The term "enhanced" and grammatical derivatives thereof with reference to the chemical in situ reaction of the first pill and the second pill refers to an increased homogeneity for the reaction relative to the degree of homogeneity achieved without the mechanical device. Examples of such mixing devices are discussed below.

In at least some instances, the method begins by choosing the components of the first pill and the second pill, taking into the account the interactions between them so that the chemical in situ reaction occurs within the desired time, preferably in the plug location. Once chosen, the first pill may be placed into the wellbore using a balanced method of placement. In one example of the methods described herein, a first pill is placed into a wellbore that includes a work string. In this instance, the first pill includes the calcium-aluminate-based cement composition (as described above). The volume of the first pill may be about 0.25 bbl to about 10,000 bbl, and any range in between these two, depending on length and diameter of the plug to be formed. This first pill is placed at the desired plug location within the wellbore. Next, the work string is removed from the plug location so as to be separated from the first pill, e.g., uphole of the first pill.

Next, the second pill (as described above, and in this instance, includes an alkaline fluid composition) is pumped into the wellbore to the plug location to be neighboring the first pill (e.g., axially adjacent the first pill within the wellbore). The volume of the second pill may be about 0.05 bbl to about 10,000 bbl, or a range between these two, depending on the length and diameter of the plug to be formed. In some instances, the work string is pulled out of the plug. Optionally, one can include a tubing release tool to drop the mixing device at the bottom of the work string used for mixing into the plug. Optionally, a spacer fluid or a separation device as described above may be placed into the wellbore before the second pill is introduced so that the first pill and the second pill do not immediately come into contact at the plug location. The spacer may delay the chemical in situ reaction, but should not negatively affect this reaction. Preferably, a separation between the first pill and the second pill is maintained until both are placed in the desired plug location, and this placement has been verified as the accurate plug location.

Upon contact, the first pill and the second pill chemically react in situ to form a set plug. The chemical reaction is exothermic, and occurs relatively quickly once the two pills come into contact. This chemical reaction causes the mixed composition to set and solidify, and thereby gain compressive strength. As used herein, the phrase "forming a set plug in a plug location" does not imply that any action other than the chemical in situ reaction need occur, whether by outside influence, human involvement, or otherwise.

In some instances, the resulting set plug preferably has a compressive strength of at least 50 psi within a set time of 1 hour at a temperature of 70° F. and a pressure of ambient downhole conditions. In other instances, the resulting set plug preferably has a compressive strength of at least 250 psi within a set time of 1 hour at a temperature of 70° F. and a pressure of ambient downhole conditions. In yet other instances, the resulting set plug preferably has a compressive strength of at least 1000 psi within a set time of 1 hour at a temperature of 70° F. and a pressure of ambient downhole conditions. Any range between may be suitable as well.

FIG. 1 is a cross-sectional schematic view of a wellbore that penetrates a subterranean formation. Work string 102 illustrates the location of the work string in the well. One should note that the geometry of the work string 102 may affect the balanced method calculations. As illustrated, the wellbore may be lined with casing 116 and an annulus 114 may be defined between the casing 116 and the work string 102. In alternative instances, the wellbore may not include a casing, i.e., it is an "open hole" wellbore and in such an instance 116 would be a wellbore side. Accordingly, FIG. 1 should not be viewed as limiting this disclosure to cased wellbores. This method of plug placement can use the pump and pull method for either pill. The pump and pull method is particularly suitable when using coiled tubing.

Well fluid 110 is a fluid present in the wellbore, e.g., well fluid 110 may be a drilling fluid, a completion fluid, a formation conditioning fluid, or the like. Plug location 112 is the desired location of the bottom of the plug. In some instances, plug location 112 can be the bottom of the wellbore (i.e., the furthest drilled depth of the wellbore). In some instances, plug location 112 can be neighboring another plug, e.g., a polymeric plug, a bridge plug, a retainer, a viscous pill or an apparatus positioned in the wellbore.

Figure 1B:
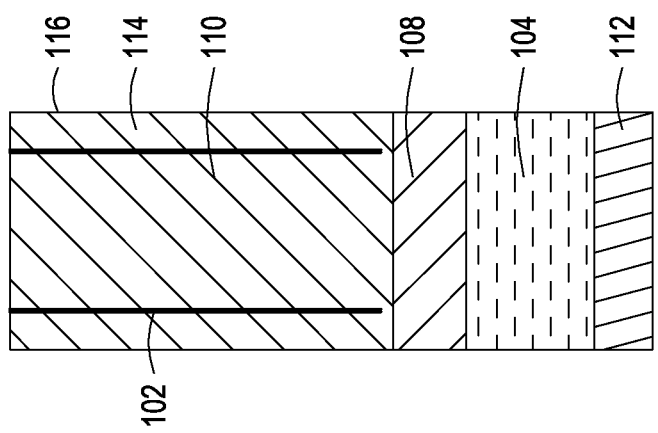
Figure 1A:
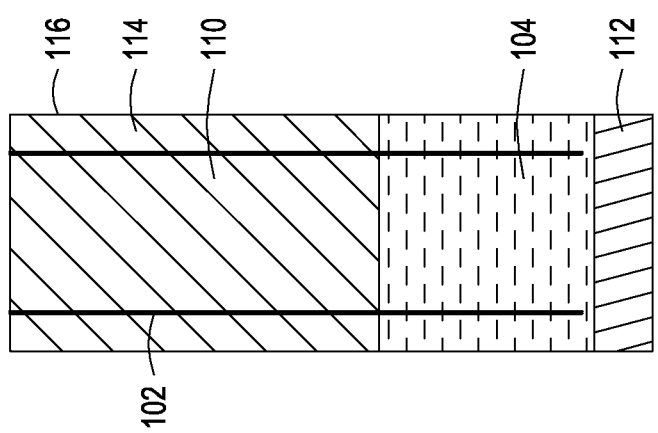

First pill 104 is placed downhole into the wellbore at the desired plug location 112, as shown in FIG. 1A. As shown in FIG. 1B, work string 102 is raised uphole relative to the plug location 112 and preferably above the first pill 104. This placement of the first pill 104 is preferably managed in view of balancing the pressures in the annulus 114 as well as other conditions present within the wellbore, as will be recognized by one skilled in the art. In some instances, this means that the fluid levels in the wellbore match with the fluid levels in the annulus.

As shown in FIG. 1B, optionally a spacer fluid 108 can be placed downhole after depositing the first pill 104. FIG. 1B shows the placement of spacer fluid 108 neighboring first pill 104 (i.e., axially adjacent within the wellbore). An alternative to the spacer fluid 108 is a suitable separation device, such as a plug or others mentioned above.

After placement of the first pill 104, preferably, the work string 102 is moved uphole relative to the spacer fluid 108, as shown in FIG. 1B.

Second pill 106 can then be placed (deposited) into the wellbore so that it neighbors (i.e., axially adjacent within the wellbore) first pill 104 (and/or spacer fluid 108), as shown in FIG. 1C. In FIG. 1C, second pill 106 has a higher density than the spacer fluid 108 so therefore with gravity falls through spacer fluid 108, FIG. 1C shows the fluids after 106 has fallen through spacer fluid 108. Preferably this happens over time to delay the chemical in situ reaction that occurs when first pill 104 and second pill 106 come into contact. The second pill 106, optionally, can be placed using a bullhead method, known to those of ordinary skill in the art, rather than a balanced method.

Note the volume of displacement of the well fluid 110 by placement of first pill 104, second pill 106, and optional spacer fluid 108, as shown in FIG. 1C.

When the first pill 104 and the second pill 106 come into contact, a chemical in situ reaction occurs causing the compositions of the pills to form a set plug, preferably at the plug location. In some instances, the set plug will form within about 60 minutes set time. In other instances, for example, the set plug will form within about 45 minutes set time. In other instances, for example, the set plug will form within about 90 minutes set time. In other instances, for example, the set plug will form within about 120 minutes set time. In other instances, for example, the set plug will form within about 180 minutes set time. Any set time occurring between these disclosed is suitable as well.

Moreover, while not wishing to be limited by any theory, it is believed that the chemical in situ reaction between the first pill 104 and the second pill 106 causes a rapid setting or solidification of the calcium-aluminate-based cement composition upon contact with the alkaline fluid composition (e.g., a C3A-free Portland cement composition). After the second pill is placed so that it contacts the first pill, the work string 102 may be removed from the wellbore. Throughout the process, it is advisable to balance the fluids and pressures between the wellbore and annulus so that adverse events do not occur, such as "pulling wet," when the work string 102 is withdrawn.

While not wishing to be limited by any theory, it is believed that through sequential placement of the first pill 104 and the second pill 106, contact between the two can be controlled so that the resulting set plug forms in the desired plug location 112. Further, sequential addition of the first pill 104 and the second pill 106 is believed to reduce the rig time required to form a desired set plug at the plug location, which can result in measurable cost-savings. Additionally, such set plugs may have enhanced resistance to degradation by wellbore conditions.

To achieve the results discussed herein, the first pill and the second pill do not need to be completely homogenized upon contact and/or when mixed (e.g., mechanically or through a density differential).

In some instances, homogeneity between the first pill and the second pill can be enhanced e.g., by using a mechanical mixing device or density gradients. Examples of such mechanical mixing devices and methods are discussed below. If using such a mixing device, it may be important to recognize that the plug may be negatively impacted by removing the work string and/or the mixing device after sufficient strength and solidification has occurred as a result of the chemical in situ reaction. Such mixing devices may be used to "enhance" the in situ reaction, which means the mixing devices help facilitate the chemical in situ reaction by physically encouraging homogeneity between the first pill and the second pill.

Suitable mixing devices may be constructed from any suitable materials such as steel, brass, ceramics, or the like.

FIG. 2 is a side view of an exemplary jet-mixing assembly 200 that may be used as a mixing device to aid in the mixing of the first pill and the second pill to optimize the chemical in situ reaction and/or the homogeneity of the mixture between the first pill and the second pill. As illustrated, the jet-mixing assembly 200 may include or be operatively coupled to a well tubing 202 and a crossover tool 204. A tubing release tool 206 may be included in the jet-mixing assembly 200 below the crossover tool 204 and may be used to aid in the release of a section of the work string in the plug.

The jet-mixing assembly 208 has at least a plurality of mixing aids shown as jet ports 210, which help to mix the first pill and the second pill. Accordingly, the jet-mixing assembly 208 may be characterized as the "mixing section" for the jet-mixing assembly 200. Optionally, the jet ports 210 may be angled downward (i.e., toward the bottom of a wellbore) to increase the exiting fluid velocity from the jet-mixing assembly 208 to aid the mixing process. Diversion tool 212 may be employed if desired as a diversion tool or ball catcher to close the open-end of the tubing 202 after spotting (depositing) the first pill.

The jet ports 210 may have any suitable diameter and geometry for mixing the fluids as planned. In some instances, the jet-mixing assembly 208 may have multiple jet ports 210. By way of example, the jet-mixing assembly 208 may have at least the following number of ports: 10, 20, 30, 40, 50, 60, 70, 80, 90, 100.

The number of jet ports 210 to include may depend on at least the size and length of the mixing section, the stability of the mixing section, the components of the first pill and the second pill, and the specific diameter, size and geometry of the jet ports 210. In some instances, at least one of the jet ports 210 has a diameter of about 0.1" to about 1". In some instances, at least one of the jet ports 210 has a diameter of about 1" to about 5". In some instances, at least one of the jet ports 210 has a diameter of about 5" to about 10". The diameter of the jet ports 210 may depend on many factors including at least the flow rate of the mixing fluids and the number of jet ports 210 in the mixing section. In some instances, as illustrated, the jet ports 210 are substantially round or oval. In other instances, the jet ports 210 may be more square or rectangular in shape. The length and diameter of the jet-mixing assembly 208 may vary in accordance with the conditions present at the well, the volume of the first pill and the second pill, and taking into consideration the balance of the pressures involved and the plug parameters.

FIG. 3 is a side view of another exemplary mixing device 300 that may be used as described herein. More particularly, the mixing device 300 may be characterized as a spiral mixer 300, which includes well tubing 302, a crossover tool 304, and a tubing release tool 306. These are similar to those described with respect to FIG. 2 at 202, 204, and 206, respectively. The spiral mixer 300 may include a mixing section in the form of an auger 308, which includes a helical screw blade. The helical screw blade of the auger 308 may be used as a mixing aid in this example. The thread pitch or lead of the helical screw blade may be optimized to provide the necessary degree of mixing without adversely interfering with the reaction. For example, the thread pitch may be optimized such that the helical screw blade makes 1 to about 10 or more revolutions along the axial length of the auger 308. A revolution is illustrated simplistically in FIG. 3 as turn 310. Rotating the well tubing 302 will cause the auger 308 to mix the first pill and the second pill. The length and diameter of the spiral mixer 300 may vary in accordance with the conditions present at the well, the volume of the first pill and the second pill, and taking into consideration the balance of the pressures involved and the plug parameters.

Figure 4:
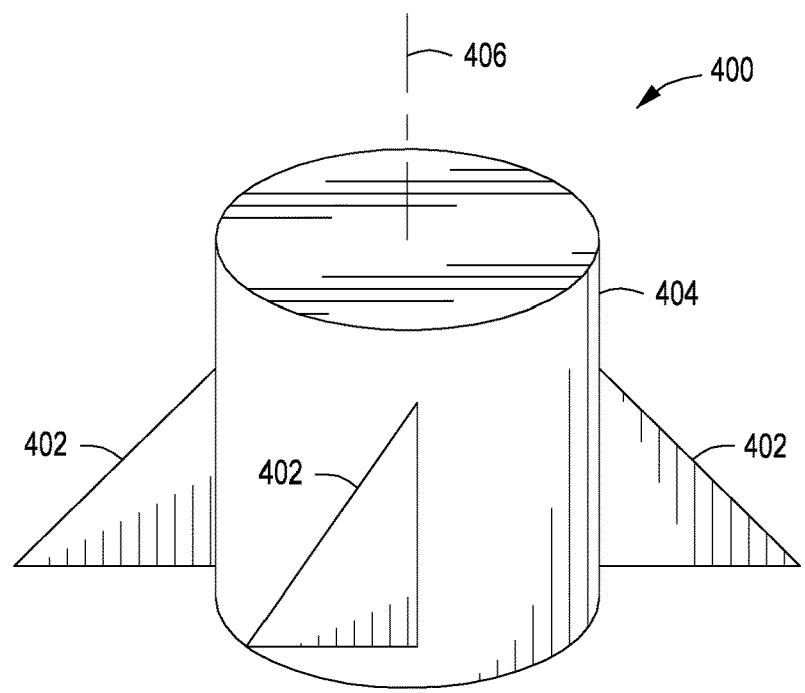
FIG. 4 illustrates a baffled mixing device that may be used as described herein.

FIG. 4 is an isometric side view of another exemplary mixing device 400 that may be useful in the methods described herein. More particularly, the mixing device 400 may be characterized a baffled mixing tool 400. The baffled mixing tool 400 may replace the jet-mixing assembly 208 (FIG. 2) or the auger 308 (FIG. 3) and, therefore, may be operatively coupled to the well tubing 202, 302, the crossover tool 204, 304, and the tubing release tool 206, 306. As illustrated, the baffled mixing tool 400 may include a mixing section 404 that includes one or more baffles 402 (three shown) that extend radially outward from a main body portion. Central axis 406 represents the interior of mixing section 404. The baffles 402 may be used as mixing aids in this example, and may be of any suitable shape. In at least one embodiment, the baffles 402 may be sacrificial in the process, meaning that they are destroyed during the mixing process. The number of baffles 402 included may depend on at least the shape of the baffle 402, the size of the baffles 402, and the size of the mixing section 404. Moreover, while depicted in FIG. 4 as having a generally triangular shape, the baffles 402 may alternatively exhibit a rectangular shape, a square shape, a round (arcuate) shape, or an oval shape, without departing from the scope of the disclosure.

The mixing section 404 may preferably be sized to allow insertion of the baffled mixing tool 400 into a wellbore with enough annulus room relative to the wellbore sides so that there is space between the edge of the baffles 402 and the wellbore sides (either open-hole or cased) to allow for mixing of the first pill and the second pill. The baffled mixing tool 400 may be activated (e.g., by the work string) within the wellbore so that the baffles 402 provide mechanical mixing action, e.g., to first pill 104, second pill 106 and (optionally) spacer fluid 108, as shown in FIG. 1. In some instances, optionally, the mixing section 404 of the baffled mixing tool 400 may be hollow and optionally include jet ports similar to the jet ports 210 of FIG. 2 to aid in mixing. In some instances, the mixing portion 404 may have the number jet ports of the geometry and diameters discussed above with respect to FIG. 2.

In some instances, the mixing section 404 may be solid so that the mixing occurs externally to this device. In some instances, the baffled tool 400 may be rotated by the work string, e.g., by turning the string clockwise. The length and width of the mixing section 404 may vary in accordance with the conditions present at the well, the volume of the first pill and the second pill, and taking into consideration the balance of the pressures involved and the plug parameters.

Figure 5:
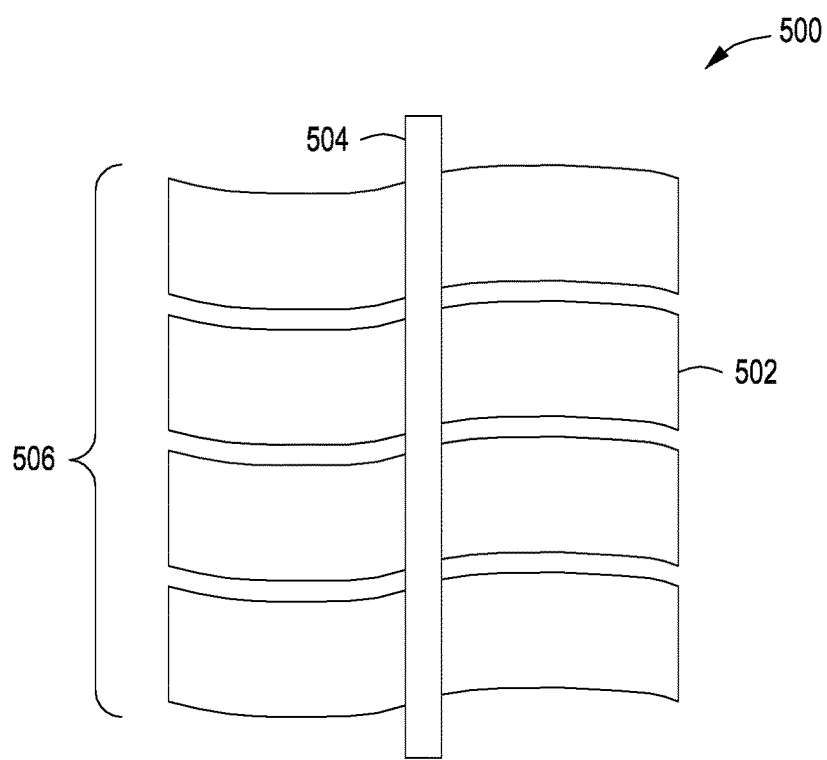
FIG. 5 illustrates another example of a spiral-mixing device that may be used as described herein.

FIG. 5 is a schematic side view of an alternative baffled mixing tool 500 that may be used in accordance with this disclosure. Similar to the baffled mixing tool 400 of FIG. 4, the baffled mixing tool 500 may replace the jet-mixing assembly 208 (FIG. 2) or the auger 308 (FIG. 3) and, therefore, may be operatively coupled to the well tubing 202, 302, the crossover tool 204, 304, and the tubing release tool 206, 306. As illustrated, the baffled mixing tool 500 may include one or more baffles 502 (the mixing aids in this example) that extend radially outward from a central body 504. The combination of the central body 504 and the baffles 502 form the mixing portion 506 of mixing tool 500. The baffles 502 may be axially spaced from each other along the central body 504, and the radial length (i.e., distance from the central body 504 to a distal end) of each baffle 502 may vary based on the wellbore conditions present and the material of construction used in the baffled mixing tool 500.

Preferably, the baffles 502 are spaced so that optimal mixing occurs without clogging the baffles 502 at the same time. In some embodiments, for example axially adjacent baffles 502 may be angularly spaced from each other about the central body 504. In some instances, the central body 504 and/or the baffles 502 may include jet ports as discussed above with respect to FIG. 2. In some instances, the baffled mixing tool 500 may be rotated by the work string, e.g., by turning the string clockwise. The baffles 502 may be sacrificial in the process.

In another example, rebar or similar rod-like structures may be placed on the exterior of the work string to provide mixing. If the tubing is released, the rebar may stay in the plug to act as a reinforcing material.

With reference again to FIG. 1, in other example of enhanced mixing methods, the relative densities of the first pill 104 and the second pill 106 can be selected so that the density of the second pill 106 is greater than that of the first pill 104 so that gravity pulls the second pill 106 down into the first pill 104 and thereby allows the chemical in situ reaction to occur. For instance, if the first pill 104 is a calcium-aluminate-based cement composition, and the second pill 106 includes an alkaline fluid composition, the alkaline fluid composition (and optionally the spacer fluid 108) may include weighting agents or other densifying additives to allow the alkaline fluid composition (and optionally the spacer fluid 108 as well) to be pulled by gravity to react with the calcium-aluminate-based cement of the first pill.

A mixing device such as those disclosed herein may be used to enhance the in situ reaction even where a density differential is also used to facilitate or enhance homogeneity.

In various embodiments, systems configured for preparing, transporting, and delivering the cement compositions, spacer fluids, and additives described herein to a downhole location are described. In various embodiments, the systems can comprise a pump fluidly coupled to a tubular (e.g., a casing, drill pipe, production tubing, coiled tubing, etc.) extending into a wellbore penetrating a subterranean formation, the tubular may be configured to circulate or otherwise convey a composition comprising the calcium-aluminate-based cement composition and/or the alkaline fluid composition. The pump may be, for example, a high-pressure pump or a low-pressure pump, which may depend on, inter alia, the viscosity and density of the cement compositions, the type of the cementing operation, the plugging operation specifics, and the like.

In some embodiments, the systems described herein may further comprise a mixing tank(s) arranged upstream of the pump and in which the cement compositions are mixed or formulated. In various embodiments, the pump (e.g., a low-pressure pump, a high-pressure pump, or a combination thereof) may convey a cement composition as described herein from the mixing tank or other source of the cement composition as described herein to the tubular. In other embodiments, however, a cement composition as described herein can be formulated offsite and transported to a worksite, in which case the a cement composition as described herein may be introduced to the tubular via the pump directly from a transport vehicle or a shipping container (e.g., a truck, a railcar, a barge, or the like) or from a transport pipeline. In yet other embodiments, the cement composition as described herein may be formulated on the fly at the well site where components of the a cement composition as described herein are pumped from a transport (e.g., a vehicle or pipeline) and mixed during introduction into the tubular. In any case, the cement composition as described herein may be drawn into the pump, elevated to an appropriate pressure, and then introduced into the tubular for delivery downhole.

FIG. 6 shows an illustrative schematic of a system that can deliver a cement composition as described herein to a downhole location, according to one or more descriptions above. It should be noted that while FIG. 6 generally depicts a land-based system, it is to be recognized that like systems may be operated in off shore, subsea locations as well. As depicted in FIG. 6, system 600 may include mixing tank 610, in which a cement composition as described herein may be formulated. Again, in some embodiments, the mixing tank 610 may represent or otherwise be replaced with a transport vehicle or shipping container configured to deliver or otherwise convey a cement composition as described herein to the well site.

The compositions described herein may be conveyed via line 612 to wellhead 614, where the cement composition enters tubular 616 (e.g., a casing, drill pipe, production tubing, coiled tubing, etc.), tubular 616 extending from wellhead 614 into wellbore 622 penetrating subterranean formation 618. Upon being ejected from tubular 616, the compositions described herein may subsequently return up the wellbore in the annulus between the tubular 616 and the wellbore 622 as indicated by flow lines 624. In other embodiments, the compositions described herein may be reverse pumped down through the annulus and up tubular 616 back to the surface, without departing from the scope of the disclosure. Pump 620 may be configured to raise the pressure of the cement composition to a desired degree before its introduction into tubular 616 (or annulus).

It is to be recognized that system 600 is merely exemplary in nature and various additional components may be present that have not necessarily been depicted in FIG. 6 in the interest of clarity. Non-limiting additional components that may be present include, but are not limited to, supply hoppers, valves, condensers, adapters, joints, gauges, sensors, compressors, pressure controllers, pressure sensors, flow rate controllers, flow rate sensors, temperature sensors, and the like.

One skilled in the art, with the benefit of this disclosure, should recognize the changes to the system described in FIG. 6 to provide for other cementing operations (e.g., squeeze operations, reverse cementing (where the cement in introduced into an annulus between a tubular and the wellbore and returns to the wellhead through the tubular), and the like).

It is also to be recognized that the compositions described herein may also directly or indirectly affect the various downhole equipment and tools that may encounter the treatment fluids during operation. Such equipment and tools may include, but are not limited to, wellbore casing, wellbore liner, completion string, insert strings, drill string, coiled tubing, slickline, wireline, drill pipe, drill collars, mud motors, downhole motors and/or pumps, surfacemounted motors and/or pumps, centralizers, turbolizers, scratchers, floats (e.g., shoes, collars, valves, etc.), wellbore projectiles (e.g., wipers, plugs, darts, balls, etc.), logging tools and related telemetry equipment, actuators (e.g., electromechanical devices, hydromechanical devices, etc.), sliding sleeves, production sleeves, plugs, screens, filters, flow control devices (e.g., inflow control devices, autonomous inflow control devices, outflow control devices, etc.), couplings (e.g., electro-hydraulic wet connect, dry connect, inductive coupler, etc.), control lines (e.g., electrical, fiber optic, hydraulic, etc.), surveillance lines, drill bits and reamers, sensors or distributed sensors, downhole heat exchangers, valves and corresponding actuation devices, tool seals, packers, cement plugs, bridge plugs, and other wellbore isolation devices, or components, and the like. Any of these components may be included in the systems generally described above and depicted in FIG. 6.

One or more illustrative embodiments incorporating the invention embodiments disclosed herein are presented herein. Not all features of a physical implementation are described or shown in this application for the sake of clarity. It is understood that in the development of a physical embodiment incorporating the embodiments of the present invention, numerous implementation-specific decisions must be made to achieve the developer's goals, such as compliance with system-related, business-related, government-related and other constraints, which vary by implementation and from time to time. While a developer's efforts might be time-consuming, such efforts would be, nevertheless, a routine undertaking for those of ordinary skill the art and having benefit of this disclosure.

Unless otherwise indicated, all numbers expressing quantities of ingredients, properties such as molecular weight, reaction conditions, and so forth used in the present specification and associated claims are to be understood as being modified in all instances by the term "about." Accordingly, unless indicated to the contrary, the numerical parameters set forth in the following specification and attached claims are approximations that may vary depending upon the desired properties sought to be obtained by the embodiments of the present invention. At the very least, and not as an attempt to limit the application of the doctrine of equivalents to the scope of the claim, each numerical parameter should at least be construed in light of the number of reported significant digits and by applying ordinary rounding techniques.

It should be noted as well that in the development of any such actual employment of the inventions described herein, numerous implementation—specific decisions must be made to achieve the developer's specific goals, such as compliance with system related and business related constraints, which will vary from one implementation to another. Moreover, it will be appreciated that such a development effort might be complex and time consuming but would nevertheless be a routine undertaking for those of ordinary skill in the art having the benefit of this disclosure.

Embodiment A

In some instances, the methods disclosed herein include a method a method comprising: (a) placing a first pill comprising a calcium-aluminate cement composition in a plug location within a wellbore, and (b) placing a second pill of a alkaline fluid composition into the wellbore adjacent to the first pill so that a chemical in situ reaction occurs between the calcium-aluminate-based cement composition and the alkaline fluid composition forming a set cement plug in the plug location. The method, in some instances, may include placing a separator into the wellbore between (a) and (b) so that a separation between the first pill and the second pill exists in the work string but allows the two fluids to come into contact in the plug location. In some instances, a further step of mixing the first pill and the second pill to facilitate the in situ reaction is included. Mixing can be enhanced through a density gradient method, employing a mixing device, or a combination thereof.

Embodiment B

In some instances, the methods disclosed herein include a method comprising: (a) inserting a tubing having a mixing device located at the bottom of the tubing into the wellbore, (b) placing a first pill comprising a calcium-aluminate-based cement composition in a plug location within a wellbore, (c) placing a second pill of a alkaline fluid composition into the wellbore adjacent to the first pill, and (d) mixing the first pill and the second pill with the mixing device during a chemical in situ reaction of the first pill and the second pill, and (e) forming a set plug in a plug location.

Embodiment C

In some instances, the methods disclosed herein include a method comprising: (a) inserting a tubing into a wellbore, the tubing having a mixing device located at a distal end thereof; (b) placing a first pill comprising a calcium-aluminate-based cement composition at a plug location within the wellbore with the tubing; (c) placing a separator within the wellbore with the tubing after the first pill to neighbor the first pill downhole, (c) placing a second pill comprising an alkaline fluid composition into the wellbore adjacent to the first pill with the tubing; (d) inserting a tubing having a mixing device located at the bottom of the tubing into the wellbore to penetrate at least the second pill; (e) mixing the first pill and the second pill with the mixing device to facilitate a chemical in situ reaction of the first pill and the second pill; and (f) forming a set plug at the plug location within a set time.

Embodiment D

In some instances, the methods disclosed herein include a mixing device for forming a set plug comprising: (a) a well tubing, (b) optionally, a crossover connected to the well tubing in a linear direction, (c) optionally, a tubing release tool connected to the crossover in a linear direction (d) a mixing section connected to the tubing release tool, the mixing section having at least one mixing aid chosen from the group consisting of: a jet port, a baffle, a spiral, and a combination thereof.

Embodiment E

In some instances, disclosed herein is a mixing assembly, comprising: well tubing; a tubing release tool operatively coupled to the well tubing and axially offset therefrom; and a mixing device operatively coupled to the tubing release tool and axially offset therefrom, the mixing device having at least one mixing aid chosen from the group consisting of: one or more jet ports, one or more baffles, a helical screw thread, and any combination thereof.

Embodiment F

In some instances, disclosed herein is a mixing assembly, comprising: well tubing; a tubing release tool operatively coupled to the well tubing and axially offset therefrom; and a baffled mixing tool operatively coupled to the tubing release tool and axially offset therefrom, the baffled mixing tool including a mixing section extending axially from the tubing release tool and providing one or more baffles that extend radially outward from a body of the mixing section.

Each of embodiments A-F may have one or more of the following additional elements in any combination:

1. The first pill or the second pill includes a suitable calcium-aluminate-based cement composition. Examples include a calcium-aluminate-based cement, which may include a calcium-aluminate cement (CAC), a calcium-aluminate magnesia cement (AM), calcium sulfoaluminate cement (CSA), and/or a calcium-aluminate phosphate cement (CAP), or a mixture thereof in an amount of about 51 weight (wt.) % to 100 wt. % of the dry powder in the calcium-aluminate-based cement composition, the remainder of the composition including an aqueous fluid and other additives suitable for the desired operation that do not negatively affect the plugging operation or the chemical in situ reaction.

2. The first pill or the second pill includes an alkaline fluid composition, depending on which pill is the aluminate-based cement composition. Suitable "alkaline fluid compositions" for use as described herein include a solid component selected from the group including Portland cement (e.g., Class C Portland cement), lime, alkali hydroxides (e.g., sodium hydroxide), alkali earth hydroxides, cement kiln dust, slag, Class C fly ash, and the like. Combinations of these may also be suitable as long as the pH of the composition is sufficiently alkaline to react with the calcium-aluminate-based cement composition in a desired way. In some instances, the compositions of the present invention are comprised of API Class H Portland cement. In some instances, the solid component comprises about 1 wt. % to 90 wt. % of an alkaline fluid composition. In some instances, the solid component comprises about 60 wt. % to 90 wt. % of a alkaline fluid composition. In some instances, the solid component comprises about 70 wt. % to 80 wt. % of a alkaline fluid composition. The balance of the compositions includes an aqueous fluid as well as any other additives suitable for the desired operation that do not negatively affect the plugging operation or the chemical in situ reaction. In some instances, the pH of an alkaline fluid compositions as described herein may be about 7 to about 14.

3. The first pill and/or the second pill may include an aqueous fluid, which can be selected from the group consisting of freshwater, brackish water, seawater, brine, and saltwater, in any combination thereof in any proportion, present in an amount sufficient to form a pumpable slurry which may be about 20% to about 180% by weight of cement (bwoc), alternatively and additionally, 25% to about 60% bwoc.

4. The first pill and/or the second pill may include a salt. Examples include sodium chloride, calcium chloride, calcium bromide, potassium chloride, potassium bromide, magnesium chloride, and any combination thereof in any proportion. Preferably, if included, the salt concentration in a composition is in the range of about 0.1% to about 40% by weight of the aqueous fluid.

5. The first pill and/or the second pill may include an additive. Examples of additives include set retarders, fluid loss additives, defoamers, foaming surfactants, fluid loss agents, suspending agents, weight materials, latex emulsions, dispersants, vitrified shale and other fillers such as fly ashes, silica flours, sands, slags, formation conditioning agents, hollow glass or ceramic beads or microspheres, cement kiln dust (CKD), fillers, friction reducers, lightweight additives, defoaming agents, expansion additives, high-density additives, lost-circulation materials, filtration-control additives, thixotropic additives, silica, barite, hematite, ilmenite, manganese tetraoxide, glass fibers, carbon fibers, nylon fibers, polyvinylalcohol fibers, polylactic acid fibers, polyvinylchloride fibers, polyethylene fibers or polyurethane fibers, and combinations and/or derivatives thereof. Any of these additives can be included at included in the first pill and/or the second pill in amounts ranging from about 0.1 wt. % to about 10 wt. %, alternatively and additionally, from about 0.3 wt. % to about 5 wt. %, and alternatively and additionally from about 2 wt. % to about 3 wt. % based on the pill volume. All ranges between these stated ranges are suitable.

6. The first pill and/or the second pill may include a set retarder. Suitable set retarders include organic acids (for example, tartaric acid, citric acid, oxalic acid, gluconic acid, oleic acid, and uric acid, and combinations thereof), monovalent cationic compounds (for example, a monovalent metal salt such as alkali metal salts of sodium, potassium and lithium), polyvalent cationic compounds (for example, alkaline earth metal salts like magnesium chloride, calcium nitrate, calcium chloride; transition metal salts such as titanium (IV) sulfate, titanium (IV) tartarate, zirconium (IV) acetate, zirconium (IV) citrate, zirconium (IV) latate, cobalt (II or III) chloride and nickel (II) chloride; or combinations thereof), and the like may be especially useful in the calcium-aluminate-based cement compositions to manage the set time of the composition. The set retarder may be included in the first pill and/or the second pill in amounts ranging from about 0.1 wt. % to about 10 wt. %, alternatively and additionally, from about 0.3 wt. % to about 5 wt. %, and alternatively and additionally from about 2 wt. % to about 3 wt. % based on the pill volume.

7. The first pill and/or the second pill may include mechanical property modifying additives. Suitable examples include carbon fibers, glass fibers, metal fibers, mineral fibers, and the like may be added to further modify the mechanical properties of the composition when pumped or set. A mechanical property modifying additive may be mixed into the first pill and/or the second pill in an amount from about 0.1 wt. % to about 10 wt. %, alternatively and additionally, from about 0.3 wt. % to about 5 wt. %, and alternatively and additionally from about 2 wt. % to about 3 wt. % based on the volume of the pill.

8. The first pill and/or the second pill may incorporate a gas so that either and/or both pills are foamed.

9. The separator is a spacer fluid, or a mechanical separation device such as plugs, darts, wiper balls, and the like.

10. In some instances, the set plug will form within about 60 minutes set time. In other instances, for example, the set plug will form within about 45 minutes set time. In other instances, for example, the set plug will form within about 60 minutes set time. In other instances, for example, the set plug will form within about 75 minutes set time. In other instances, for example, the set plug will form within about 90 minutes set time. In other instances, for example, the set plug will form within about 105 minutes set time. In other instances, for example, the set plug will form within about 120 minutes set time. In other instances, for example, the set plug will form within about 135 minutes set time. In other instances, for example, the set plug will form within about 150 minutes set time. In other instances, for example, the set plug will form within about 165 minutes set time. In other instances, for example, the set plug will form within about 180 minutes set time. In other instances, for example, the set plug will form within about 195 minutes set time.

11. In some instances, the chemical in situ reactions results in formation of ettringite in the mixed cement system and rapid set of the set plug.

12. In some instances, the first pill and the second pill have differing densities such that the second pill is denser than the first. In some instances, the density differential can range from 0.1 lb/gal to 10 lb/gal, or in some instances, 0.5 lb/gal to 5 lb/gal.

13. The volume of the first pill may be about 0.25 bbl to about 10,0000 bbl, and any range in between these two, and the volume of the second pill may be about 0.05 bbl to about 10,000 bbl, or an range between these two.

14. A jet-mixing device (such as shown in FIG. 2) is used to enhance the in situ reaction of the first pill and the second. In some instances, the mixing section may have about 10 to about 100 or more jet ports. The number of jet ports to include may depend on at least the size and length of the mixing portion, the stability of the mixing portion, the components of the first pill and the second pill, and the specific diameter, size and geometry of the ports. In some instances, at least one of the jet ports has a diameter of about 0.1" to about 10". The jet-mixing device can further include a crossover tool operatively coupled to the well tubing and axially interposing the tubing release tool and the well tubing.

15. A spiral-mixing device (such as shown in FIG. 3) is used to enhance the in situ reaction of the first pill and the second. The period of the spiral of the mixing portion can be adjusted so that there are about 1 to about 10 or more turns in the mixing section spiral. The spiral-mixing device can further include a crossover tool operatively coupled to the well tubing and axially interposing the tubing release tool and the well tubing.

16. A baffled-mixing device (such as shown in FIG. 4 or FIG. 5) is used to enhance the in situ reaction of the first pill and the second. Baffles 402 are the mixing aids in this example and may be of any suitable shape, and may be sacrificial in the process. The baffles may have a triangular shape, a rectangular shape, a square shape, a round shape, or an oval shape. The mixing device may be activated (e.g., by the work string). Optionally, the baffled mixing device includes jet ports. In some instances, the baffle mixing tool 400 may be rotated by the work string. The baffled-mixing device can further include a crossover tool operatively coupled to the well tubing and axially interposing the tubing release tool and the well tubing.

17. The one or more baffles exhibit a cross-sectional shape selected from the group consisting of triangular, rectangular, square, rounded, oval, or any combination thereof.

18. The mixing section comprises a central body and the one or more baffles include a plurality of baffles axially spaced from each other along the central body.

19. The axially adjacent baffles of the plurality of baffles are angularly spaced from each other about the central body.

By way of non-limiting example, exemplary combinations applicable to Embodiments A, B, C, D, E, F include any combination of elements 1-3, and optionally 4-19. Exemplary combinations applicable to Embodiments A, B, C, D, E, F include any combination of elements 1-3, and optionally 4-19 with at least one of elements 14, 15, and 16. Specific examples include elements 1-3 and element 4, optionally with at least one of elements 14-19. Specific examples include elements 1-3 and element 5, optionally with at least one of elements 14-19. Specific examples include elements 1-3 and element 6, optionally with at least one of elements 14-19. Specific examples include elements 1-3 and element 7, optionally with at least one of elements 14-19. Specific examples include elements 1-3 and element 8, optionally with at least one of elements 14-19. Specific examples include elements 1-3 and element 9, optionally with at least one of elements 14-19. Specific examples include elements 1-3 and element 10, optionally with at least one of elements 14-19. Specific examples include elements 1-3 and element 11, optionally with at least one of elements 14-196. Specific examples include elements 1-3 and element 12, optionally with at least one of elements 14-19. Specific examples include elements 1-3 and element 13, optionally with at least one of elements 14-19.

Specific examples include at least elements 1-3 and element 14, and optionally 15-19. Specific examples include at least elements 1-3 and element 15, and optionally 16-19. Specific examples include at least elements 1-3 and element 16 and optionally 17-19.

To facilitate a better understanding of the embodiments of the present invention, the following examples of preferred or representative embodiments are given. In no way should the following examples be read to limit, or to define, the scope of the invention.

EXAMPLES

In one example, a 15.5 pounds per thousand gallons ("lb/gal") calcium aluminate cement (CAC) composition and a 16.0 lb/gal Portland cement (PC) composition were prepared having the ingredients listed below. Each composition was designed to have a low driving force for hydration and strength development at room temperature by incorporation of retarding agents. For the CAC composition the retarding agent is citric acid, and that for the PC composition it is sodium lignosulfonate. Table 1 below illustrates the components of the CAC composition. Table 2 below illustrates the components of the PC composition.

TABLE 2

| PC Composition | |
| --- | --- |
| Material | Test Amount |
| Class H Portland cement | 797.02 g |
| Sodium lignosulfonate | 3.99 g |
| Fresh water | 349.33 |

TABLE 1

| CAC Composition | |
| --- | --- |
| Material | Test Amount |
| Calcium-aluminate | 395.21 g |
| Type F fly ash | 395.21 g |
| Sodium hexametaphosphate | 41.6 g |
| Citric acid | 8.32 g |
| Fresh water | 274.04 g |

Figure 7C:
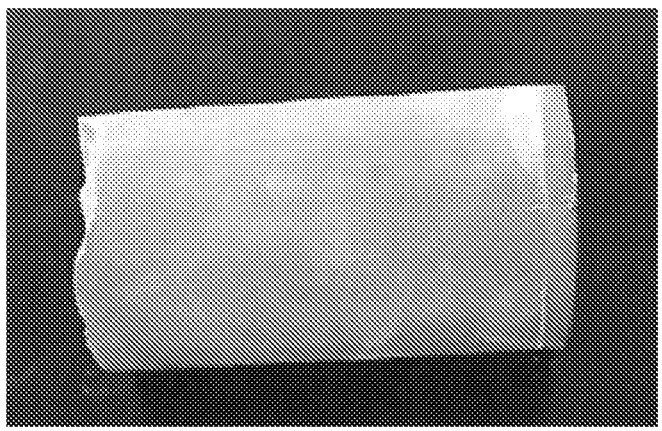
FIG. 7 (including FIGS. 7A, 7B & 7C) show set plugs formed in the laboratory and are described in the Example section below.
Figure 7B:
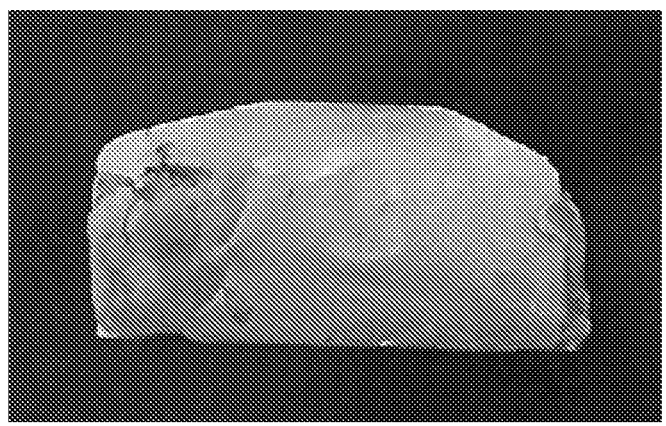
Figure 7A:
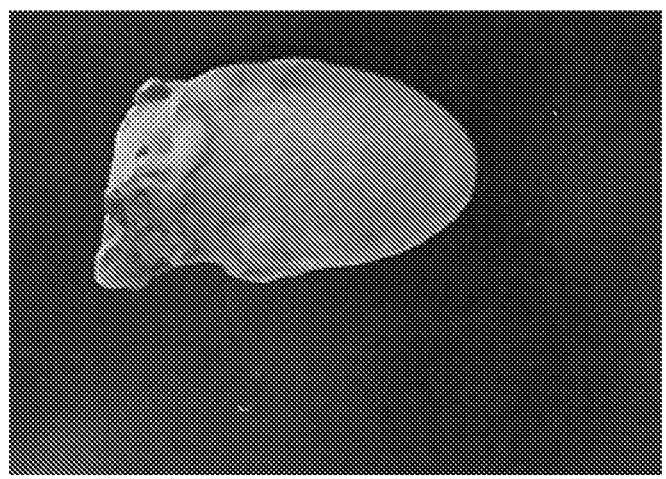

First, 144 mL of the CAC composition was added to a 2-inch diameter cylinder. Then, 36 mL of the PC composition was then added to the CAC composition using a syringe under ambient laboratory conditions. Three laboratory plugs were formed using three methods of mixing the PC composition with the CAC composition to facilitate the chemical in situ reaction between the two compositions. The three methods of mixing were: slow (as observed) addition from the syringe, fast (as observed) addition from the syringe, and fast (as observed) addition from the syringe with 30 seconds of moderate stirring with a glass rod to replicate mechanical mixing. Photographs of the resulting set laboratory plugs are shown in FIGS. 7A-7C. FIG. 7A is a photograph of a laboratory plug relating the first method, FIG. 7B is a photograph of a laboratory plug relating to the second method, and FIG. 7C is a photograph of a laboratory plug relating to the third method.

The plug illustrated in 7C was tested for compressive strength 67 minutes after mixing was stopped and exhibited a value of 59 psi at room temperature and pressure. The other laboratory plugs were not testing for compressive strength because of the geometry of the body formed. After 315 minutes, the strength laboratory plug depicted in FIG. 7C was 87 psi at room temperature and pressure.

A sample of the each CAC and PC slurry was set aside for observation. Neither set up and developed compressive strength within the test time of 24 hours under ambient conditions.

Figure 8:
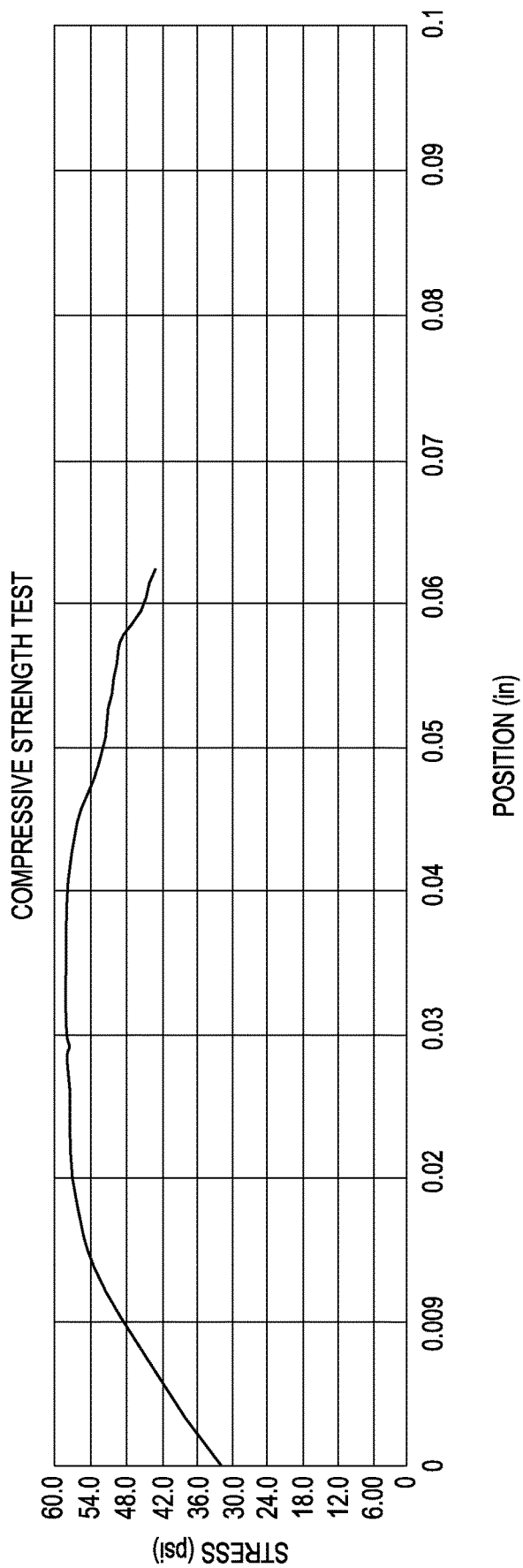
FIG. 8 shows a compressive strength test result and is described in the Example section below.

FIG. 8 is a line graph from a UCA compressive strength test for the laboratory plug depicted in FIG. 7C.

Our conclusion from this example is that the compressive strength and uniformity of a laboratory plug formed by mixing CAC and PC slurry come into contact is strongly dependent upon the degree of mixing. Slow addition appears to result in isolated regions of strength development within the plug, whereas more rapid addition appears to result in improved uniformity. Furthermore, rapid addition with mixing appears to result the most favorable plug within testing conditions.

Therefore, the present invention is well adapted to attain the ends and advantages mentioned as well as those that are inherent therein. The particular embodiments disclosed above are illustrative only, as the present invention may be modified and practiced in different but equivalent manners apparent to those skilled in the art having the benefit of the teachings herein. Furthermore, no limitations are intended to the details of construction or design herein shown, other than as described in the claims below. It is therefore evident that the particular illustrative embodiments disclosed above may be altered, combined, or modified and all such variations are considered within the scope and spirit of the present invention. The invention illustratively disclosed herein suitably may be practiced in the absence of any element that is not specifically disclosed herein and/or any optional element disclosed herein. While compositions and methods are described in terms of "comprising," "containing," or "including" various components or steps, the compositions and methods can also "consist essentially of" or "consist of" the various components and steps. All numbers and ranges disclosed above may vary by some amount. Whenever a numerical range with a lower limit and an upper limit is disclosed, any number and any included range falling within the range is specifically disclosed. In particular, every range of values (of the form, "from about a to about b," or, equivalently, "from approximately a to b," or, equivalently, "from approximately a-b") disclosed herein is to be understood to set forth every number and range encompassed within the broader range of values. Also, the terms in the claims have their plain, ordinary meaning unless otherwise explicitly and clearly defined by the patentee. Moreover, the indefinite articles "a" or "an," as used in the claims, are defined herein to mean one or more than one of the element that it introduces.

What is claimed is:

1. A method comprising:
   (a) placing a first pill comprising a calcium-aluminate-based cement composition comprising water and a calcium-aluminate cement, at a plug location within a wellbore,
   (b) placing a second pill comprising an alkaline fluid composition comprising water with a pH above 7, into the wellbore axially adjacent to the first pill; and
   (c) mixing the first pill and the second pill at the plug location to facilitate a chemical in situ reaction between the first pill and the second pill, and thereby form a set plug at the plug location;
   wherein mixing the first pill and the second pill at the plug location comprises at least one of:
   (i) conveying a jet mixing assembly into the wellbore at or near the plug location; and operating the jet mixing assembly to enhance the chemical in situ reaction of the first pill and the second pill;
   (ii) conveying a spiral mixer into the wellbore at or near the plug location; and operating the spiral mixer to enhance the chemical in situ reaction of the first pill and the second pill; or
   (iii) conveying a baffled mixing tool into the wellbore at or near the plug location; and
   operating the baffled mixing tool to enhance the chemical in situ reaction of the first pill and the second pill.

2. The method of claim 1, further comprising placing a separator between the first pill and the second pill so that a separation between the first pill and the second pill exists in the work string and the second pill is axially adjacent to the separator before being axially adjacent to the first pill, wherein the separator is selected from the group consisting of: a spacer fluid, a plug, a dart, a wiper ball, and a combination thereof.

3. The method of claim 1, wherein the first pill comprises a cement in an amount of about 25 wt. % to 100 wt. % of the calcium-aluminate-based cement composition, the cement being selected from the group consisting of: calcium-aluminate cement, a calcium-aluminate magnesia cement, calcium sulfoaluminate cement, a calcium-aluminate phosphate cement, and combinations and/or derivatives thereof.

4. The method of claim 1, wherein the second pill comprises a solid component 1 wt. % to 90 wt. % of the alkaline fluid composition, the solid component being selected from the group consisting of: a Portland cement, a Class C Portland cement, lime, an alkali hydroxide, sodium hydroxide, an alkali earth hydroxides, cement kiln dust, slag, Class C fly ash, and combinations and/or derivatives thereof.

5. The method of claim 1, wherein the first pill and/or the second pill comprise an aqueous fluid present in the amount of about 20% to about 80% of the cement or solid component, the aqueous fluid being selected from the group consisting of freshwater, brackish water, seawater, brine, saltwater, and combinations thereof.

6. The method of claim 1, wherein the first pill and/or the second pill comprise an additive selected from the group consisting of: a salt, a set retarder, an expansion additive, a fluid loss additives, a defoamer, a foaming surfactant, a fluid loss agent, a suspending agent, a weight material, a latex emulsion, a dispersant, vitrified shale, a filler, fly ash, silica flour, a sand, a slag, a formation conditioning agent, a hollow glass or ceramic bead or microsphere, cement kiln dust, a filler, a friction reducer, a light-weight additive, a defoaming agent, a high-density additive, a lost-circulation material, a filtration-control additive, a thixotropic additive, silica, barite, hematite, ilmenite, manganese tetraoxide, a glass fiber, a carbon fiber, a nylon fiber, a polyvinylalcohol fiber, a polylactic acid fiber, a polyvinylchloride fiber, a polyethylene fiber, a polyurethane fiber, and combinations thereof.

7. The method of claim 1, wherein the first pill and/or the second pill comprises a set retarder, the set retarder being selected from the group consisting of: an organic acid, tartaric acid, citric acid, oxalic acid, gluconic acid, oleic acid, uric acid, a monovalent cationic compound, a monovalent metal salt, an alkali metal salt of sodium, an alkali metal salt of potassium, an alkali metal salt of lithium, a polyvalent cationic compound, an alkaline earth metal salt, magnesium chloride, calcium nitrate, calcium chloride, a transition metal salt, titanium (IV) sulfate, titanium (IV) tartarate, zirconium (IV) acetate, zirconium (IV) citrate, zirconium (IV) latate, cobalt (II or III) chloride and nickel (II) chloride; or combinations thereof), and combinations thereof.

8. The method of claim 1, wherein the first pill and/or the second pill comprises a mechanical property modifying additive, the mechanical property modifying additive being selected from the group consisting of: a carbon fiber, a glass fiber, a metal fiber, a mineral fiber, and combinations and/or derivatives thereof.

9. The method of claim 1, wherein the first pill and/or the second pill is foamed.

10. The method of claim 1, wherein the set plug forms within about 45 minutes to about 190 minutes set time.

11. The method of claim 1, wherein second pill is more dense than the first pill resulting in a density differential of about 0.1 lb/gal to about 10 lb/gal.

12. The method of claim 1, wherein mixing the first pill and the second pill at the plug location comprises utilizing a mixing assembly that comprises a well tubing; a tubing release tool operatively coupled to the well tubing and axially offset therefrom; and at least one of:
 (i) the jet-mixing assembly operatively coupled to the tubing release tool and axially offset therefrom, the jet-mixing assembly having a jet tube section extending axially from the tubing release tool and defining one or more jet ports;
 (ii) the spiral mixer operatively coupled to the tubing release tool and axially offset therefrom, the spiral mixer including an auger extending axially from the tubing release tool and providing a helical screw blade; or
 (iii) the baffled mixing tool operatively coupled to the tubing release tool and axially offset therefrom, the baffled mixing tool including a mixing section extending axially from the tubing release tool and providing one or more baffles that extend radially outward from a body of the mixing section.

13. A method comprising:
(a) placing a first pill comprising a calcium-aluminate-based cement composition comprising water and a calcium aluminate cement, at a plug location within a wellbore with a tubing;
(b) placing a separator within the wellbore with the tubing axially adjacent and uphole of the first pill;
(c) placing a second pill comprising an alkaline fluid composition comprising water with a pH above 7, into the wellbore adjacent to the first pill with the tubing;
(d) inserting a tubing having a mixing device located at the bottom of the tubing into the wellbore to penetrate at least the second pill;
(e) mixing the first pill and the second pill with the mixing device to facilitate a chemical in situ reaction between the first pill and the second pill; and
(f) forming a set plug at the plug location within a set time,
wherein mixing the first pill and the second pill with the mixing device comprises at least one of:
 (i) operating a jet mixing assembly to enhance the chemical in situ reaction of the first pill and the second pill;
 (ii) operating a spiral mixer to enhance the chemical in situ reaction of the first pill and the second pill; or
 (iii) operating a baffled mixing tool to enhance the chemical in situ reaction of the first pill and the second pill.

14. The method of claim 13 wherein (d) occurs before (a), (d) occurs after (a), or (d) occurs after (c).

15. The method of claim 13, wherein a density differential exists between the first pill and the second pill of about 0.1 lb/gal to about 10 lb/gal, and the second pill has a greater density.

16. The method of claim 13, wherein the separator is selected from the group consisting of: a spacer fluid, a mechanical device, a plug, a dart, a wiper ball, and a combination thereof.

* * * * *